No. 842,788. PATENTED JAN. 29, 1907.
F. M. HUNTOON.
SOLAR HEATER.
APPLICATION FILED SEPT. 4, 1906.
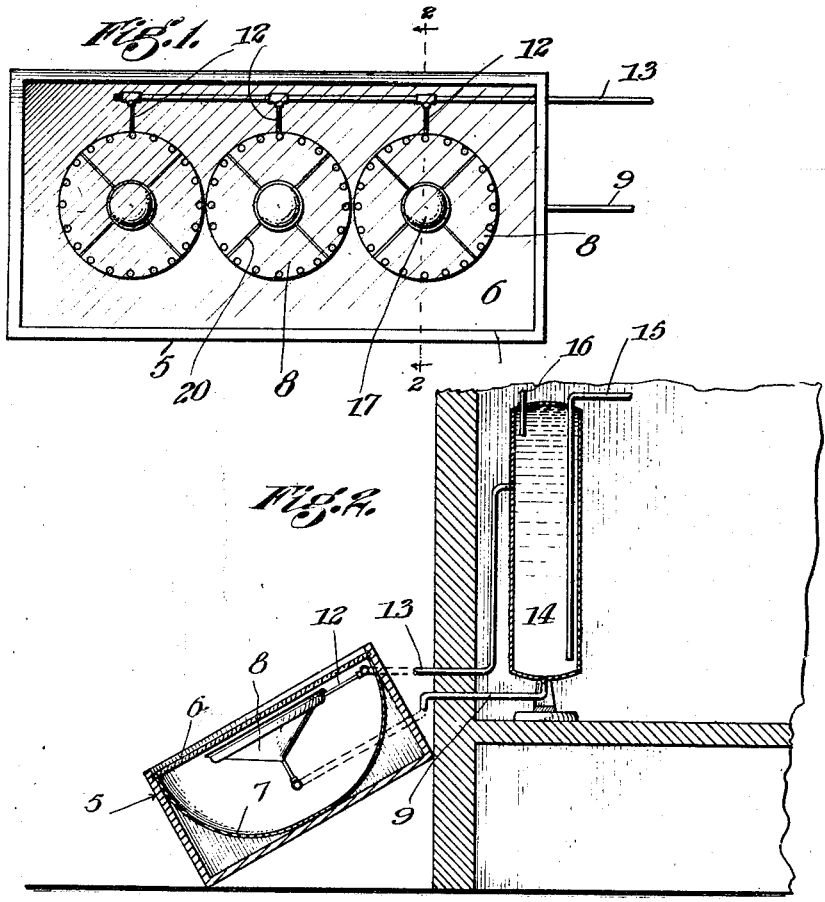
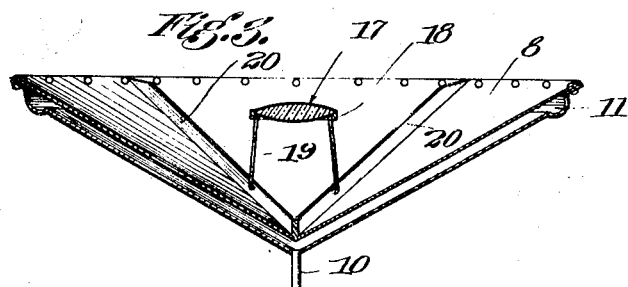

UNITED STATES PATENT OFFICE.

FRED M. HUNTOON, OF RIVERSIDE, CALIFORNIA.

SOLAR HEATER.

No. 842,788.  Specification of Letters Patent.  Patented Jan. 29, 1907.

Application filed September 4, 1906. Serial No. 333,256.

*To all whom it may concern:*

Be it known that I, FRED M. HUNTOON, a citizen of the United States, residing at Riverside, in the county of Riverside and State of California, have invented new and useful Improvements in Solar Heaters, of which the following is a specification.

My invention relates to means for utilizing the heat of the sun's rays to raise the temperature of the water and to means for storing the same in large quantities when heated; and the object thereof is to produce a device of this class of great efficiency in which a constant circulation of water is maintained while the heating-receptacles are subjected to the heat of the sun.

Heretofore in solar heaters the heating and storing of the heated water has been in the same receptacle, whereby only a limited amount of water could be heated at a time, because the heated water along the top of the receptacle would prevent the full utilization of the sun's rays, and the water at the top of the receptacle would be unduly heated, because always subjected to the heat from the sun's rays, while the water in the lower portion of the receptacle would not be sufficiently heated, because of the imperfect circulation of the water in such structures and the absorption of the heat by the upper stratum of water. I obviate this difficulty and obtain a perfect circulation and the full utilization of the heat of the sun's rays by the device described herein and illustrated in the accompanying drawings, in which—

Figure 1 is a plan of a solar heater embodying my invention equipped with three heating-receptacles. Fig. 2 is a section on the line 2 2 of Fig. 1 and a section of a corner of a room with the storage-reservoir therein in central section. Fig. 3 is an enlarged central section through one of the heating-receptacles.

In the drawings, 5 is the usual wooden case, which is provided with a transparent top 6. Within the case is a reflector 7 for directing back upon the under side of the heater such rays as miss the heater in the downward passage of the rays. Located within the case and above the reflector are a plurality of heating-receptacles 8, which are preferably formed of thin sheet metal, with the walls cone-shaped, as best shown in Figs. 2 and 3. The walls of the receptacle are quite close together, and the apex of the cone is placed downward, or away from the sun. A connection is made at the apex of the receptacle with the supply-pipe 9 by means of a branch pipe 10, which connects the supply-pipe to the heating-receptacle when there are a plurality of heating-receptacles within the glass-covered case. These branch pipes are preferably smaller than the main supply-pipe. When a single heating-receptacle is used, the supply-pipe would be connected directly to the apex thereof. In the outer wall, preferably at a point farthest removed from the apex thereof, the metal is preferably expanded to form a channel 11, and to this channel the delivery-pipe 12 is connected. Where there are a plurality of heaters, pipes 12 are connected to a common delivery-pipe 13, which leads to and opens into the upper portion of the storage boiler or tank 14. Supply-pipe 9 is connected to and opens into the lower portion of the storage-tank 14. This storage-tank is provided with the ordinary supply-pipe 15, which is connected to a source of water-supply. (Not shown.) Storage-tank 14 is also provided with the usual service-pipe 16, which leads to the place of use. The glass-covered case containing the heating-receptacles is preferably placed on the sunny side of the house at a point below the bottom of the storage-tank. By this construction it will be seen that as the water is heated in the receptacles it will rise and pass into the storage-tank and the colder water from the storage-tank will pass into the heating-receptacles, thereby keeping up a constant circulation of water through the heating-receptacles and the storage-tank.

By placing a burning-glass 17 so as to focus the heat upon the inlet to the heating-receptacle greater efficiency is obtained from the heater than when used without such a glass, as the water is thereby subjected to an intense heat as it enters the receptacle. This burning-glass is held in frame 18, which is preferably supported by legs 19, which are secured to the strengthening-ribs 20, which ribs are secured to the upper walls of the receptacle to strengthen the same.

Having described my invention, what I claim is—

1. A solar heater comprising a glass-covered box; a cone-shaped heating-receptacle within said box having the apex thereof projecting downwardly or away from the glass cover; a supply-pipe connected to said receptacle at the apex of the cone; and a service-pipe connected to said receptacle at the base of the cone.

2. A solar heater comprising a glass-covered box; a water-heating receptacle within said box, said receptacle being comprised of two slightly-separated hollow metallic cones united at their bases, the apex of the cones being projected away from the glass cover; a supply-pipe connected to the outer wall of the heating-receptacle at the apex thereof; and a service-pipe connected to said receptacle at the base of the cones.

3. A solar heater comprising a glass-covered box; a water-heating receptacle within said box, said receptacle being comprised of two slightly-separated hollow metallic cones united at their bases, the apex of the cones being projected away from the glass cover; a burning-glass within said box above said heating-receptacle, said burning-glass being arranged to focus the rays of heat upon the apex of the receptacle; a supply-pipe connected to the outer wall of said receptacle at the apex thereof; and a service-pipe connected to said receptacle at the base of the cone.

4. A solar heater comprising a glass-covered box; a water-heating receptacle within said box, said receptacle being comprised of two slightly-separated hollow metallic cones united at their bases, the apex of the cones being projected away from the glass cover; a storage-tank; a pipe connected to the bottom of said storage-tank and to the outer wall of the heating-receptacle at the apex thereof; and a pipe connecting said heating-receptacle from the base of the cone to the upper portion of the storage-tank.

In witness that I claim the foregoing I have hereunto subscribed my name this 25th day of August, 1906.

FRED M. HUNTOON.

Witnesses:
H. G. KOSTER,
B. B. BUSH.